(12) United States Patent
Daly

(10) Patent No.: US 7,655,819 B2
(45) Date of Patent: Feb. 2, 2010

(54) POLYMERS WITH ANTIMICROBIAL, BIORESISTANT AND FUNGAL RESISTANT PROPERTIES

(75) Inventor: Thomas Daly, Chicago, IL (US)

(73) Assignee: TPAT IP LLC, Chicago, IL (US)

( * ) Notice: Subject to any disclaimer, the term of this patent is extended or adjusted under 35 U.S.C. 154(b) by 0 days.

(21) Appl. No.: 11/193,776

(22) Filed: Jul. 29, 2005

(65) Prior Publication Data

US 2006/0217517 A1  Sep. 28, 2006

Related U.S. Application Data

(63) Continuation of application No. 10/350,928, filed on Jan. 23, 2003, now abandoned.

(60) Provisional application No. 60/351,620, filed on Jan. 24, 2002, provisional application No. 60/361,448, filed on Mar. 21, 2002, provisional application No. 60/392,007, filed on Jun. 26, 2002, provisional application No. 60/411,907, filed on Sep. 18, 2002.

(51) Int. Cl.
*C07C 205/00* (2006.01)
*C07C 205/08* (2006.01)
*C07C 205/13* (2006.01)
*C08G 59/00* (2006.01)
*C08G 59/02* (2006.01)
*C08G 18/48* (2006.01)

(52) U.S. Cl. ............................ 568/713; 528/76; 528/85; 528/397; 528/403; 528/405; 568/704; 568/712

(58) Field of Classification Search .................. 528/85, 528/288, 397, 76, 403, 405; 514/2; 568/704, 568/712, 713
See application file for complete search history.

(56) References Cited

U.S. PATENT DOCUMENTS

| | | | | |
|---|---|---|---|---|
| 2,888,409 A | 5/1959 | Bender et al. | ................. | 260/2.5 |
| 3,156,679 A | 11/1964 | Roy, Jr. | .................... | 526/230.5 |
| 4,109,074 A | 8/1978 | Creighton et al. | ............ | 526/320 |
| 4,263,424 A | 4/1981 | Buckley et al. | ................ | 528/85 |
| 4,264,745 A | 4/1981 | Foucht | ........................ | 521/171 |
| 4,326,977 A * | 4/1982 | Schmolka | .................... | 510/132 |
| 4,851,588 A * | 7/1989 | Kupper et al. | ................ | 568/713 |
| 5,013,762 A | 5/1991 | Smith et al. | .................. | 514/470 |
| 5,075,510 A | 12/1991 | Williams et al. | ............. | 568/713 |
| 5,084,477 A | 1/1992 | Walter et al. | ................. | 514/461 |
| 5,705,709 A * | 1/1998 | Guettes et al. | .............. | 568/614 |
| 5,712,342 A | 1/1998 | Kim et al. | .................... | 524/591 |
| 5,798,115 A | 8/1998 | Santerre et al. | ............. | 424/423 |
| 5,866,511 A | 2/1999 | Dallmier et al. | ............. | 504/150 |
| 6,183,825 B1 | 2/2001 | Crook | ........................ | 428/34.7 |
| 6,294,589 B1 | 9/2001 | Moody | ........................ | 521/76 |
| 2002/0143139 A1 | 10/2002 | Chen et al. | | |
| 2003/0194445 A1* | 10/2003 | Kuhner et al. | ............... | 424/622 |

OTHER PUBLICATIONS

ANGUS Chemical Company, Technical Data Sheet TDS 15; "Nitro Alcohols".*

* cited by examiner

*Primary Examiner*—Vasu Jagannathan
*Assistant Examiner*—Benjamin J Gillespie
(74) *Attorney, Agent, or Firm*—Clifford Kraft

(57) ABSTRACT

A polymer that contains an antimicrobial, bioresistant and fungal resistant moiety that is linked into the backbone of the polymer. The moiety is a bromine atom and a nitro group linked to one or more of the carbon atoms forming the backbone. The moiety can appear in the polymer chain in various levels of occurrence from 5 ppm to has high as 100% with a normal occurrence of between 1000 ppm to 20,000 ppm. Polymer types that can be created with this moiety to display these properties include, but are not limited to, polyurethane, polyurea, polyamide, polyester, polycarbonate, polyether, polysiloxane, epoxy, polyacrylic, polyacrylate, polyvinyl.

1 Claim, 7 Drawing Sheets

POLYMERS WITH ANTIMICROBIAL, BIORESISTANT AND FUNGAL RESISTANT PROPERTIES

This application is a continuation of application Ser. No. 10/350,928 filed Jan. 23, 2003 now abandoned and is related to, and claims priority from, U.S. Provisional application 60/351,620 filed Jan. 24, 2002. This application is also related to, and claims priority from, U.S. Provisional application 60/361,448 filed Mar. 21, 2002. This application is also related to, and claims priority from, U.S. Provisional patent application 60/392,007 filed Jun. 26, 2002. This application is also related to and claims priority from U.S. provisional patent application 60/411,907 filed Sep. 18, 2002. Applications 60/351,620, 60/361,448 and 60/392,007 are hereby incorporated by reference. This application also claims priority from German patent application DE 202 11 854 filed Aug. 1, 2002.

FIELD OF THE INVENTION

The present invention relates to the field of polymers and paints containing polymers and more particularly to polymers with bioresistant, fungal resistant and antimicrobial/antifungal properties.

DESCRIPTION OF THE PROBLEM SOLVED BY THE INVENTION

Due to environmental regulation, the use of tin, mercury, lead, and other heavy metals in coatings is illegal in most of the developed world. In particular marine coatings and paint suffer a failure mode when attacked by microbes. The problem is especially acute in that section of the hull of a vessel that is alternately submerged and exposed to air. Microbial attack can eventually destroy the coating completely. Previously, heavy metals were used in coatings to combat this attack.

Some methods have been devised that distribute an oil—soluble antimicrobial agent in the coating, relying on the water insolubility and limited mobility of the agent in the coating to hold the agent. However, it is well known that all liquids, and to a lesser extent all solids, are either somewhat soluble in water, or can be absorbed or leached into water to some extent. After repeated cycles of being submerged and exposed, the agent is sufficiently leached from the coating rendering the coating susceptible to microbial attack; hence the coating becomes ineffective. One solution to the leaching problem has been to create a coating that is sacrificial and is designed to wear away as it ages, exposing fresh antimicrobial agent to the surface. Here the life is proportional to coating thickness. Thick coatings are however a problem in marine coatings as they increase the weight and cost of the coating.

The painting of the hull of a marine vessel is a very expensive and cumbersome operation because the vessel must be drydocked. This is expensive in itself, and costs increase because of the length of time the vessel must be out of service. Thus, any means of extending the protective coating's life has great economic impact.

What is badly needed is a polymer type coating that has bioresistive, fungal resistive or antimicrobial/antifungal properties that can be used in paints and in other applications of polymers where it is desired to prevent microbial attack of the polymer and/or prevent the polymer from acting as a substrate and/or food source for bacteria, and/or fungi, or can kill microbes directly.

It is also believed that polymers of the type described in this invention will aid in the adhesion of the polymer to various substrates when used as part of a coating or adhesive.

SUMMARY OF THE INVENTION

The present invention comprises a polymer that contains an antimicrobial moiety that is linked into the backbone of the polymer. This moiety is, in general, a bromine atom and a nitro ($NO_2$) group linked to one or more of the carbon atoms forming the backbone of the polymer. While the present invention is directed primarily to urethane type polymers, the moiety taught should also be effective when linked onto a carbon atom in the backbone of any polymer. The moiety can appear in the polymer chain in various levels of occurrence. A preferred occurrence of around 1000 parts per million to around 20,000 parts per million is effective. However the frequency of occurrence can be as low as 5 parts per million to as high as 100%. Polymer types within the scope of the invention include, but are not limited to polyurethane, polyurea, polyamide, polyester, polycarbonate, polyether, polysiloxane, epoxy, polyacrylic, polyacrylate and polyvinyl linkages.

It is well known in the art to combine an organic isocyanate with a polyol (poly alcohol) or polyol polymer in the presence of a suitable catalyst to form a polyurethane polymer. The present invention adds a bromo-nitro substituted diol or polyol to a standard polyol to be used in the polymer synthesis. The proportion of substituted compound used is chosen to yield the desired concentration of the moiety in the final polymer. A preferred diol for the application is bromonitropropanediol or 2-bromo-2-nitro-propane-1-3-diol or simply BNPD. This particular diol is a solid material with varying degrees of solubility in other polyols and has proven antimicrobial properties.

In addition, BNPD has been shown to have no tetragenecy (cancer causing effects) and is approved by the CFTA at levels of up to 0.1% for use in cosmetics. BNPD has also been used in baby wipes for its antimicrobial properties.

The fact that the active antimicrobial moiety is covalently linked directly into the backbone of the polymer prevents it from leaching out under even very severe conditions of repeated submersion and exposure. In addition, the moiety is not photo-active or decomposed by sunlight or exposure to mineral salts such as sodium chloride as found in sea water.

Because BNPD is a substituted diol, it is a natural reactant to form part of a polymeric chain with an isocyanate. Also, being a diol, it mixes directly with a wide range of solvents, polyols and other performance enhancing additives with no difficulty or adverse reactions. In fact, it can be mixed in any desired proportion (to the extent that it is soluble with or without the aid of a solvent or co-solvent) with any standard polyol used in synthesizing polyurethane or other polymers. There also appears to be little ability of the bromine or nitro group to form undesirable cross links in the resulting polymer. BNPD can also be added directly to an isocyanate or polyisocyanate and heated to the reaction temperature required for the specific isocyanate or polyisocyanate. If an excess of isocyanate is added in various proportions, such as 2 equivelents to one, a BNPD containing isocyanate or polyisocyanate results. This product is then an excellent component to cross-link other polyols or polyamines.

While bromonitropropanediol (BNPD) is the preferred antimicrobial agent because of its proven activity and its benign effects on the environment and on humans, it is clear to one skilled in the art that other diols or polyols with bromine and nitro groups linked at the same or different carbon atoms could also be incorporated into the backbone of polymers. Therefore other antimicrobial agents that can be linked onto a diol or polyol chain are within the scope of the present invention.

DETAILED DESCRIPTION OF THE INVENTION

Figure 1:
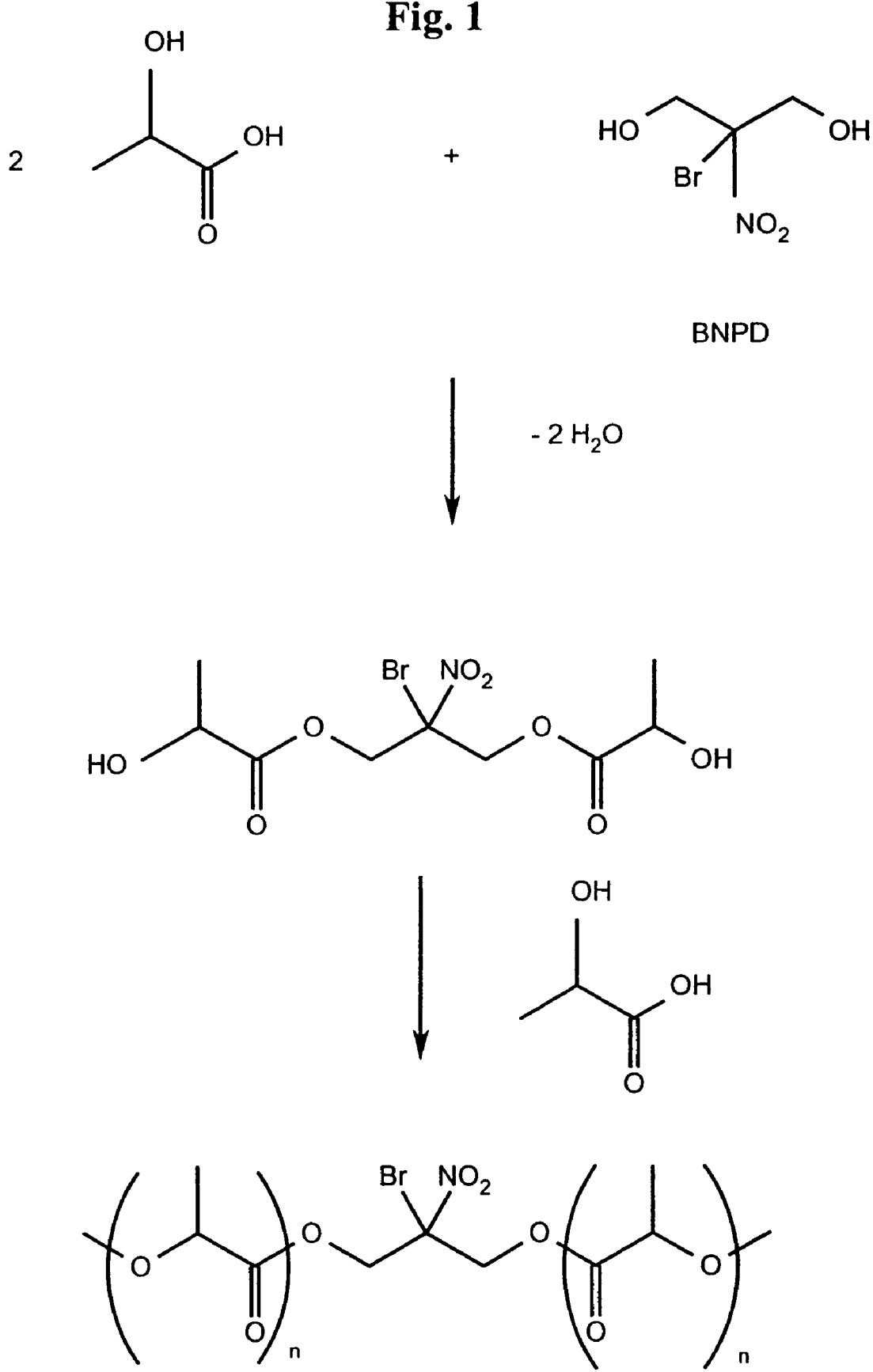
FIG. 1. Shows the generic steps of forming a polymer with a bromine/nitor moiety after removal of water and condensation polymerization.

It is well known in the art to combine polyols or polyol pre-polymers with organic isocyanates and other materials to form polymers and polymer resins. In particular paints, including marine paint, many times contains polyurethane or other polymer coating materials. A generic urethane has the following structure:

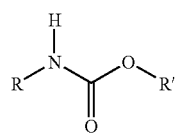

It is well known in the art that R and R' can be the same or different. A typical polyurethane polymer is made up of chains of the form:

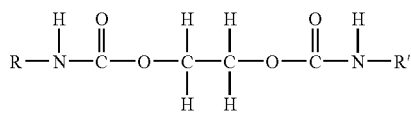

or of the form:

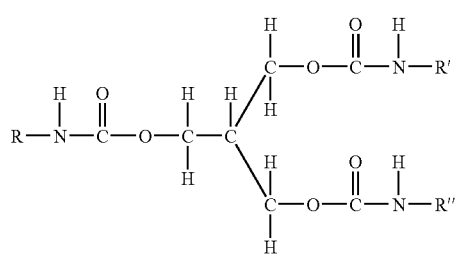

It is also known that the compound bromonitropropanediol or 2-bromo-2-nitro-propane-1-3-diol (BNPD) has antimicrobial properties. Tests on this compound have shown that it is effective against various strains of both gram positive and gram negative bacteria in concentrations of 1-50 ppm with the average minimum inhibitory concentration being around 25 ppm. In addition, work has indicated that BNPD is also antifungal.

BNPD has the following structure:

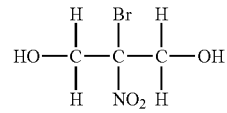

Because BNPD is a polyol, it can be combined with other polyol or polyol pre-polymers to make many polymers and coatings. In particular, BNPD mixed polyols can be combined with organic isocyanates to form polyurethane type coatings and polymers. This causes the active moiety to become covalently linked into the backbone of the polymer. In particular, BNPD or similar compounds containing the desired moiety can be mixed with the polyol component of commercially available two-component systems known in the art. In the case of polyurethane, the linked moiety is similar to:

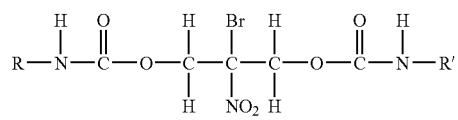

Or more generally:

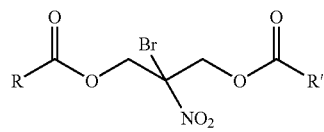

While BNPD is a preferred polyol starting point to link the active moiety into a polymer, it is within the scope of the present invention to use many other materials that contain a bromine atom and nitro group linked near one another. The preferred class of compounds have the bromine and nitro linked to the same carbon atom; however, it is felt that a moiety where the bromine and nitro are not linked to the same carbon, but near each other will still be effective. Many other compounds are within the scope of the present invention. In particular, bromonitromethanediol, bromonitroethanediol, bromonitrobutanediol, etc. can also be substituted into polymer backbones with similar results. The prior art has shown that bromonitromethane is effective for the treatment of nematodes in the soil (See U.S. Pat. No. 5,013,762) and as a general biocide (See U.S. Pat. No. 5,866,511). It is felt that bromonitromethanediol and similar diols will be equally effective.

The present invention also includes using a BNPD or BNPD analog as the terminus, such as:

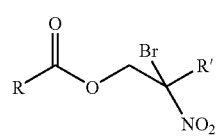

Where R' can be, but is not limited, to CH2OH, OH, CH3, or H. The present invention also includes the presence of BNPD or a BNPD analog as described above as a sidechain as is the case in FIG. 2.

Methods of making polyurethane coatings for paints are well known in the art. For example U.S. Pat. No. 5,712,342 gives several examples of a process for producing a water-dispersion of polyurethane resin for a paint using a prepolymer of approximate molecular weight 800 made from phenylpropane and various isocyanates such as isophorondiisocyanate to produce final polymers with average molecular weights of around 3200 for coatings used in paint. This patent (U.S. Pat. No. 5,712,342) is hereby incorporated by reference.

U.S. Pat. No. 3,936,409 teaches a method of manufacturing urea-urethanes using organic solvents. Formation in solution where the solvent is allowed to evaporate causing a cure, and immediate formation through the use of a spray gun are taught. This patent (U.S. Pat. No. 3,936,409) is hereby incorporated by reference.

The present invention dissolves BNPD or similar substituted hydrocarbon diols into the polyols, with or without the aid of a solvent or co-solvent, used to create the prepolymers so that the active moiety of bromine and nitro becomes linked into the backbone of the final polymer at an occurrence rate of between 5 ppm up to 100% with a preferred occurrence rate of around 1000 ppm. The molecular weights of final polymers can range from several thousand for coatings to hundreds of thousands or higher for various other polymers where antimicrobial or antifungal properties are desired.

U.S. Pat. No. 5,798,115 teaches linking of other antimicrobial agents into the backbone of polymers used in medical applications. In particular diisocynates are reacted with an antimicrobial agent ciprofloxacin to form polymeric materials. Here a biodegradable polymer is formed that releases antimicrobial substances as it is degraded by enzymes. This patent (U.S. Pat. No. 5,798,115) is hereby incorporated by reference.

Polymers for the medical industry and many other purposes containing the active moiety of bromine and nitro linked to an aliphatic chain which is covalently bonded into the polymer backbone for the purpose of killing microbes or inhibiting degradation caused by microbes or fungus are also within the scope of the present invention. In fact, the present invention finds application wherever a polymer is needed that has antimicrobial, antifungal, bioresistant or fungal resistant properties.

The present invention covalently links a bromine/nitro moiety into the backbone of a polymer to provide antibaterial or anti-fungal effect. The general principle taught by the present invention applies to polyurethane, polyurea, polyacrylates, polymethacrylates, polyacrylics, polyesters, polyamides, polyimides, polycarbonates, polyglycolic acid, polylactic acid, polyethers, polysiloxanes, epoxies and many other types of polymer structures.

Of particular interest are polymers made from polylactic acid. These polymers have been known in the art since 1932. Lactic acid can be made commercially by fermenting dextrose from corn. Lactic acid intermediates called lactides are made from L-lactic acid and R-lactic acid. Properties of the final polymers can be controlled by the percentage of L and R isomer ratios.

Polylactic acid polymers have the property that they are biodegradable. Because applications of the present invention include many applications that may require or desire inhibiting the natural rate of this biodegradation, the present invention applies to this class of polymer as well. An example of a polylactic acid polymer using the teachings of the present invention combines lactic acid with BNPD. A polymer is formed with the bromine/nitro moiety after removal of water and condensation polymerization. The generic steps are shown in FIG. 1. It should be remembered that the steps shown in FIG. 1 are only generic and that other ways of linking in the bromine/nitro moiety are within the scope of the present invention.

Similar to polylactic acid, polyglycolic acid is of particular interest. Polyglycolic acid is another biodegradeable polymer that can benefit from controlling the rate of biodegradation.

Another class of polymers using the teachings of the present invention are polymethacrylate polymers used in contact lenses such as polymacon.

Figure 2:
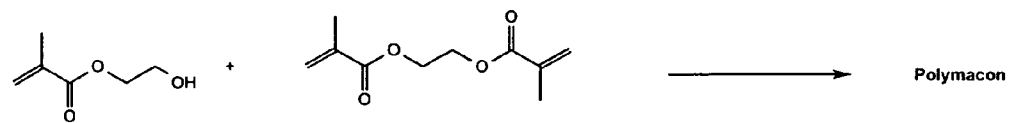
FIG. 2 and FIG. 2A show the standard method of making polymacon as well as two methods of making a modified polymacon containing the desired moiety.
Figure 2:
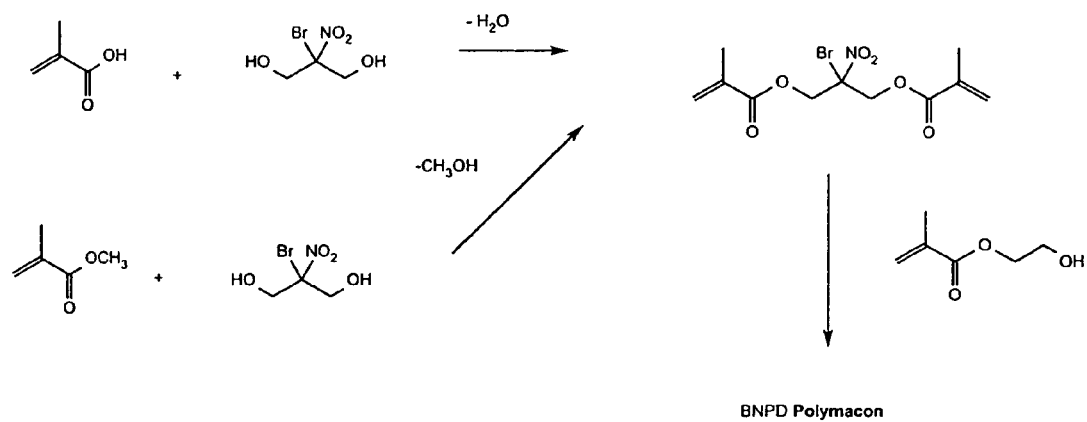
Figure 2A:
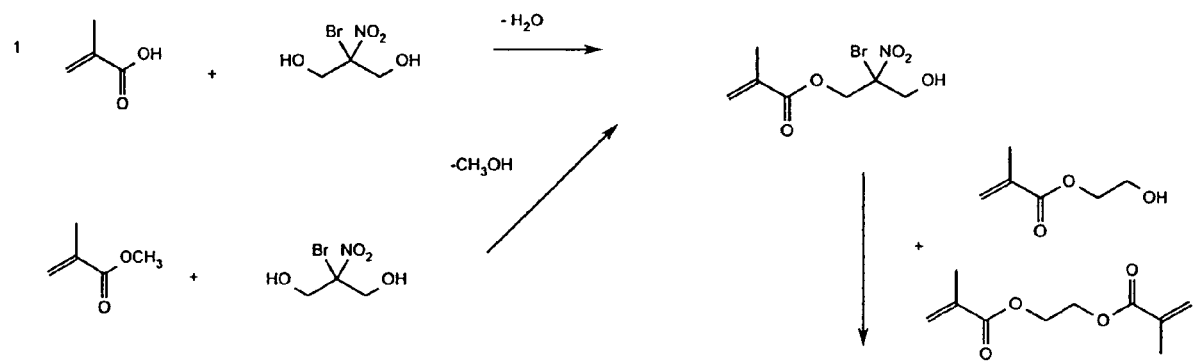

FIG. 2 and FIG. 2A show the standard method of making polymacon as well as two methods of making a modified polymacon containing the desired moiety. Either methacrylic acid or methyl methacrylate can be combined with BNPD or a similar diol with a bromine and nitro group linked to the same carbon atom. Generally 2 moles of methacrylic acid are reacted with one mole of BNPD (however, equamolar quantities can also be used). The resulting product can then be combined with ethylene glycol dimethacrylate (2-Hydroxyethyl Methacrylate). Ethylene glycol monomethacrylate can also be added to reach the desired properties.

U.S. Pat. No. 4,109,074 teaches the basic process for making this type of hydrophilic polymer from the monomer. The basic polymer is prepared by heating a monomer such as ethylene glycol monomethacrylate to a certain temperature for a certain time. No initiator or catalyst is used in the original process. This has the desirable property of yielding a polymer that is immediately free of any toxic residue from an initiator or catalyst. This is particularly desirable in medical products such as contact lenses. This patent (U.S. Pat. No. 4,109,074) is hereby incorporated by reference.

A major problem with contact lenses is the danger of bacterial infection leading to eye irritation or even more serious infections that can result in blindness. It would be very desirable to be able to produce a suitable hydrophilic polymer that inhibits bacterial growth at its surface. The linking of the bromine/nitro moiety as herein taught can result in a suitable polymer with the desired bacterial resistant properties.

Figure 3:
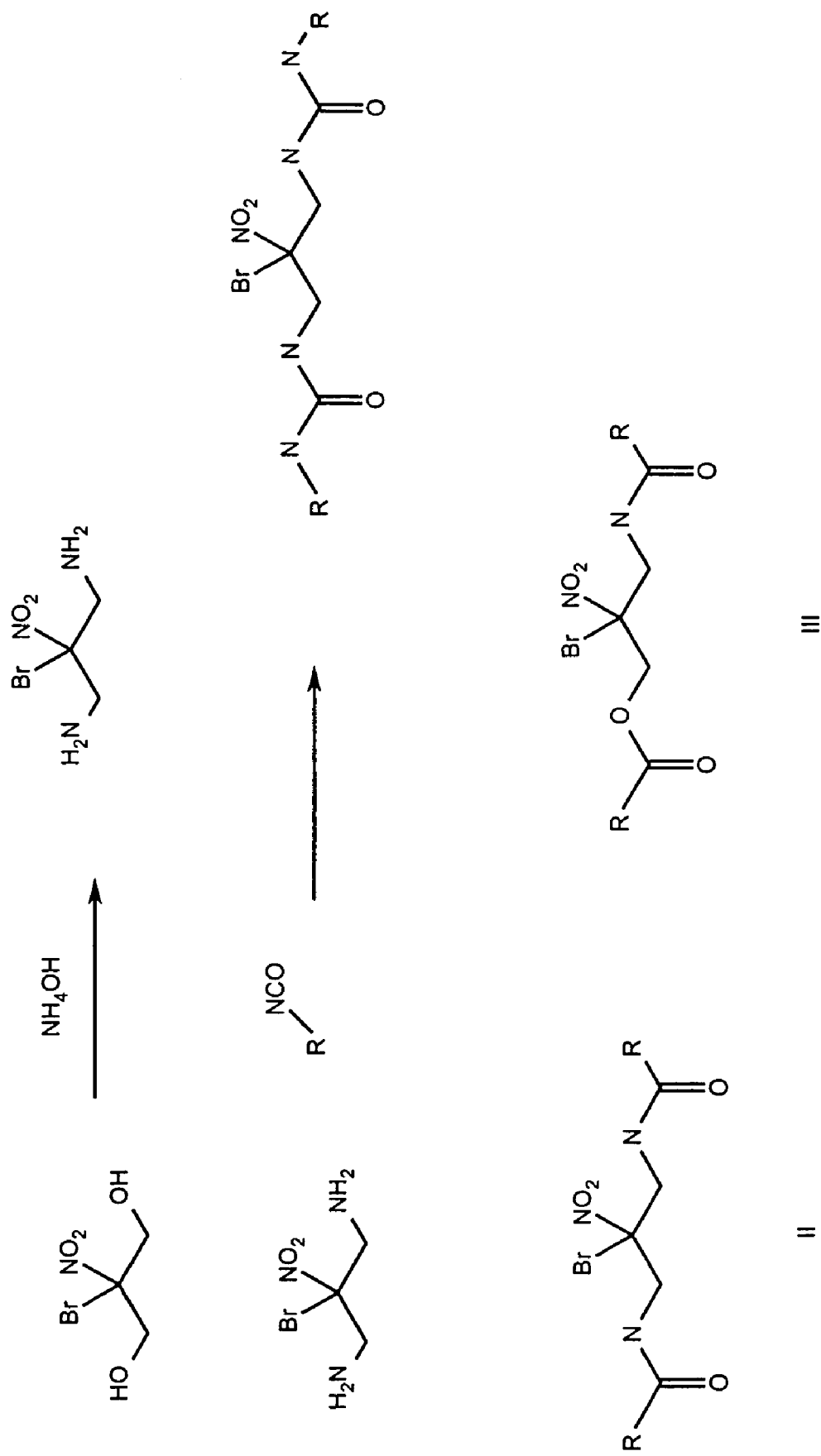
FIG. 3 shows treatment of BNPD with ammonium hydroxide to form a bromonitro amine or diamine which can then be combined with an isocyanate compound such as TDI (toluene diisocyanate) to yield a polyurea.

FIG. 3 shows treatment of BNPD with ammonium hydroxide to form a bromonitro amine or diamine which can then be combined with an isocyanate compound such as TDI (toluene diisocyanate) to yield a polyurea. FIG. 3 shows two possible structures that are within the scope of the present invention, one with two nitrogens linked to a carbonyl group and one with only one.

Figure 4:
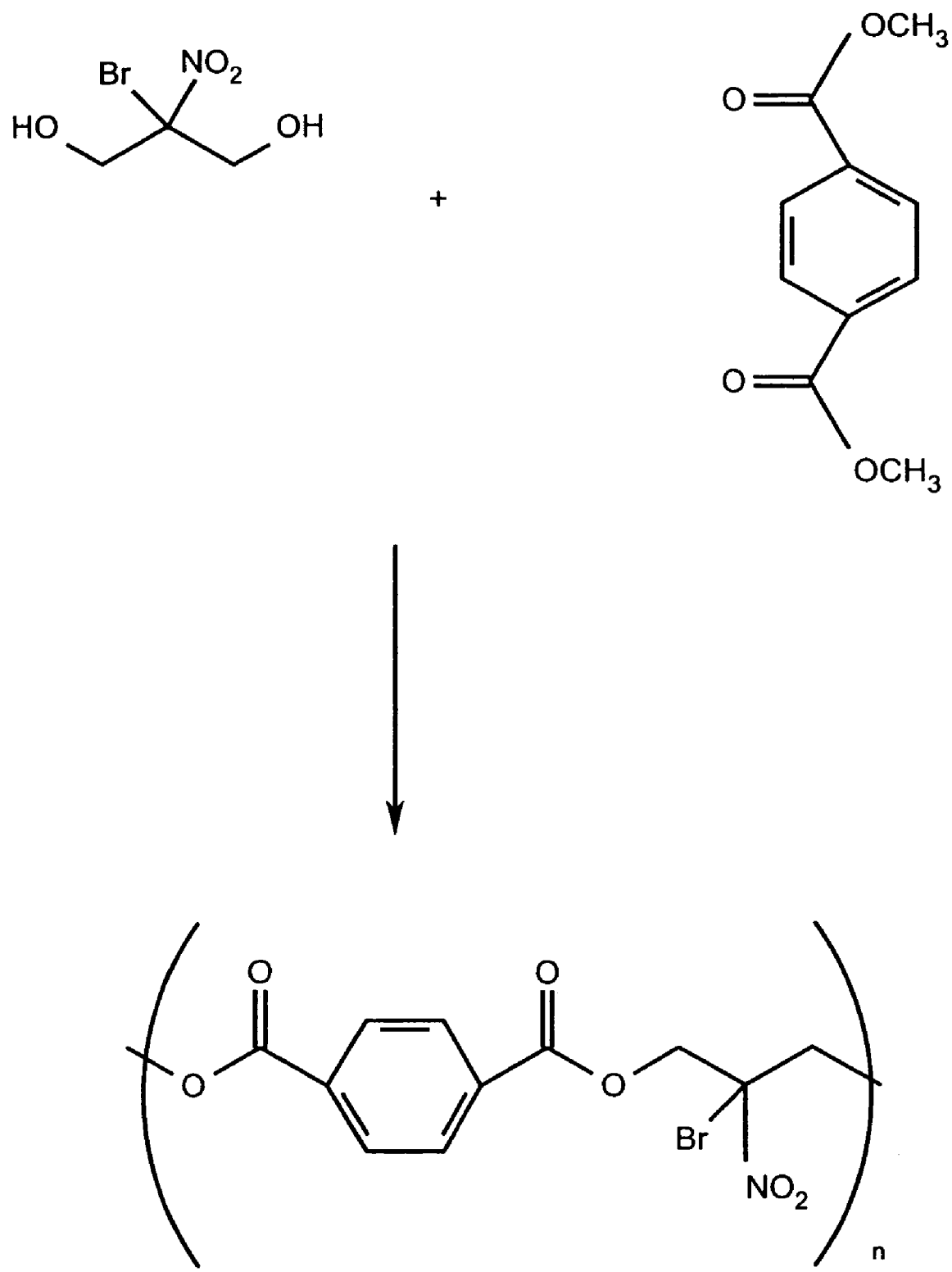
FIG. 4 shows BNPD used to form a polyester.
Figure 5:
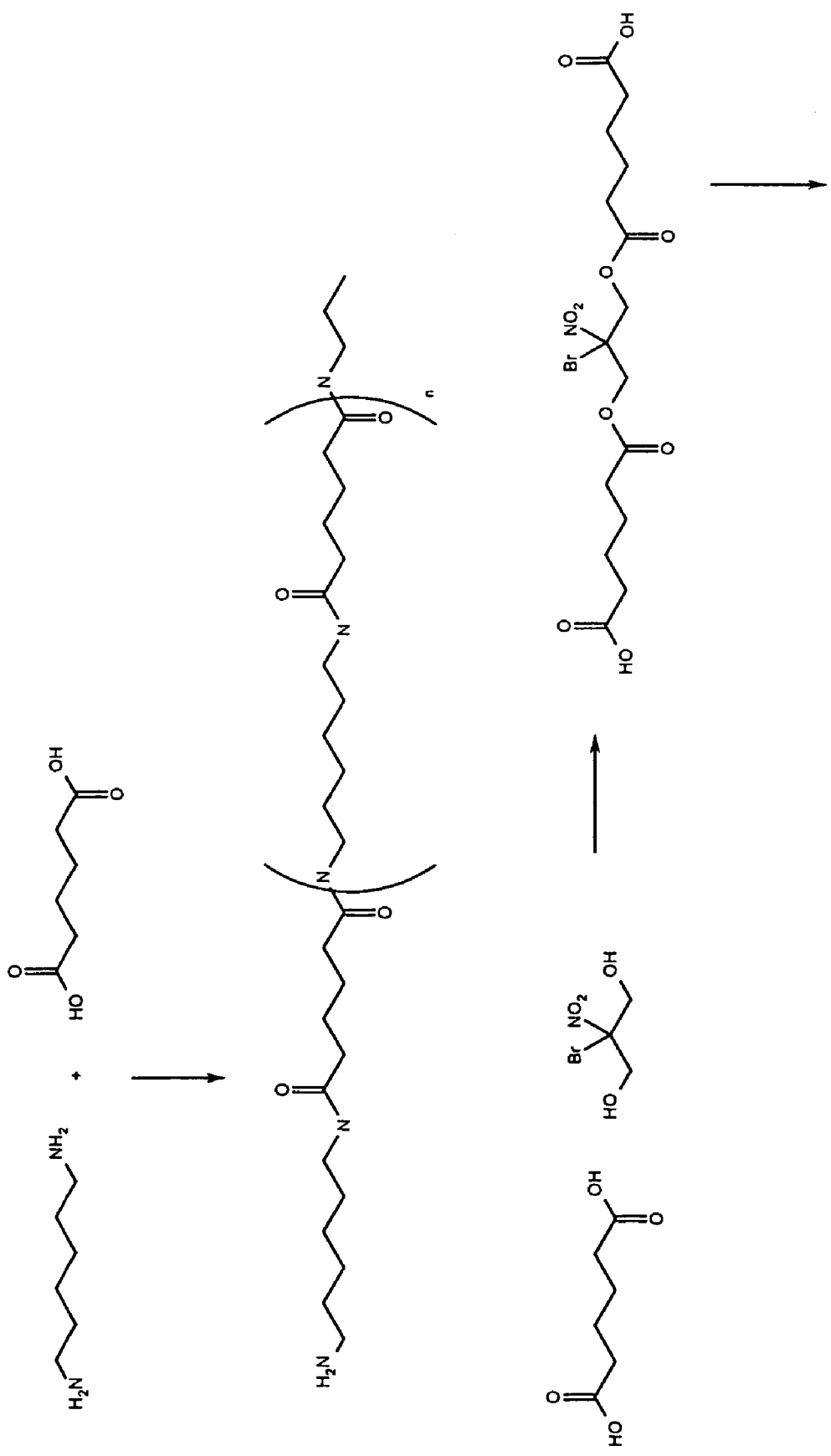
FIG. 5 shows a polyamide structure.
Figure 6:
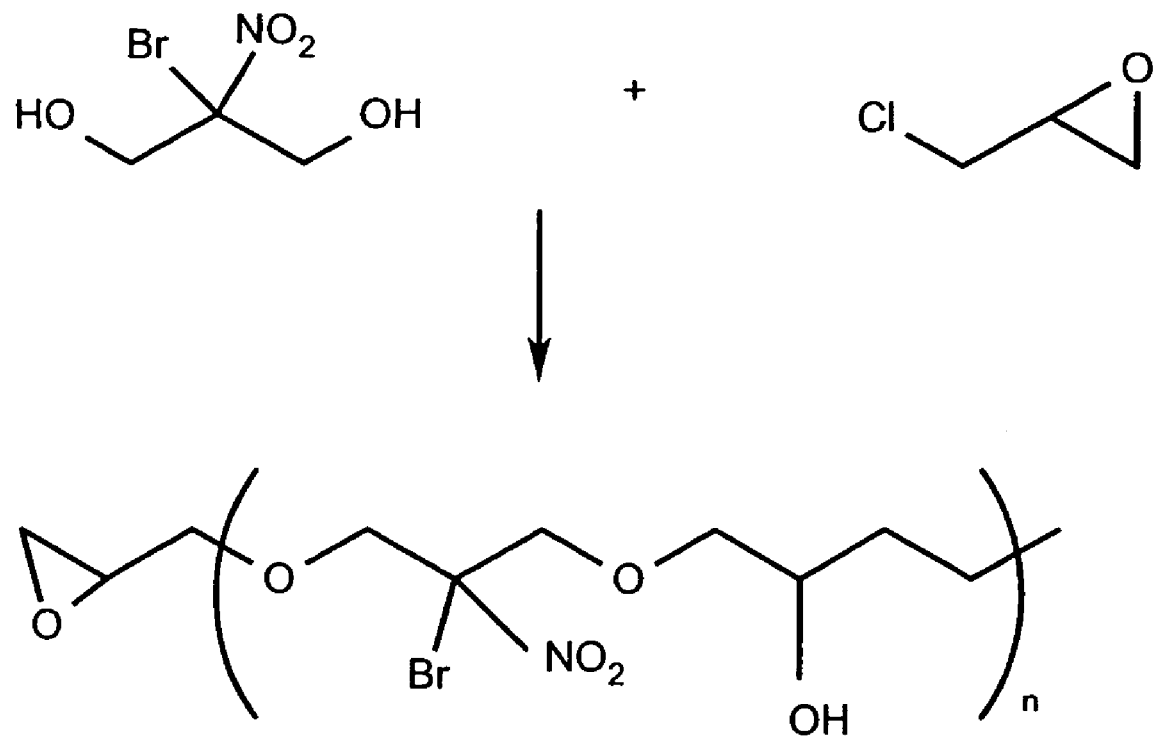
FIG. 6 shows a modified epoxy resin.

FIG. 4 shows BNPD used to form a polyester, while FIG. 5 shows a polyamide structure. FIG. 6 shows the standard structure of the polyamide known as Nylon Sixty-Six (NYLON is the registered trademark of DuPont Corp.). The modified polyamide structure containing the bromine/nitro moiety is clearly seen. It should be understood that the all polyamides are within the scope of the present invention.

Figure 7:
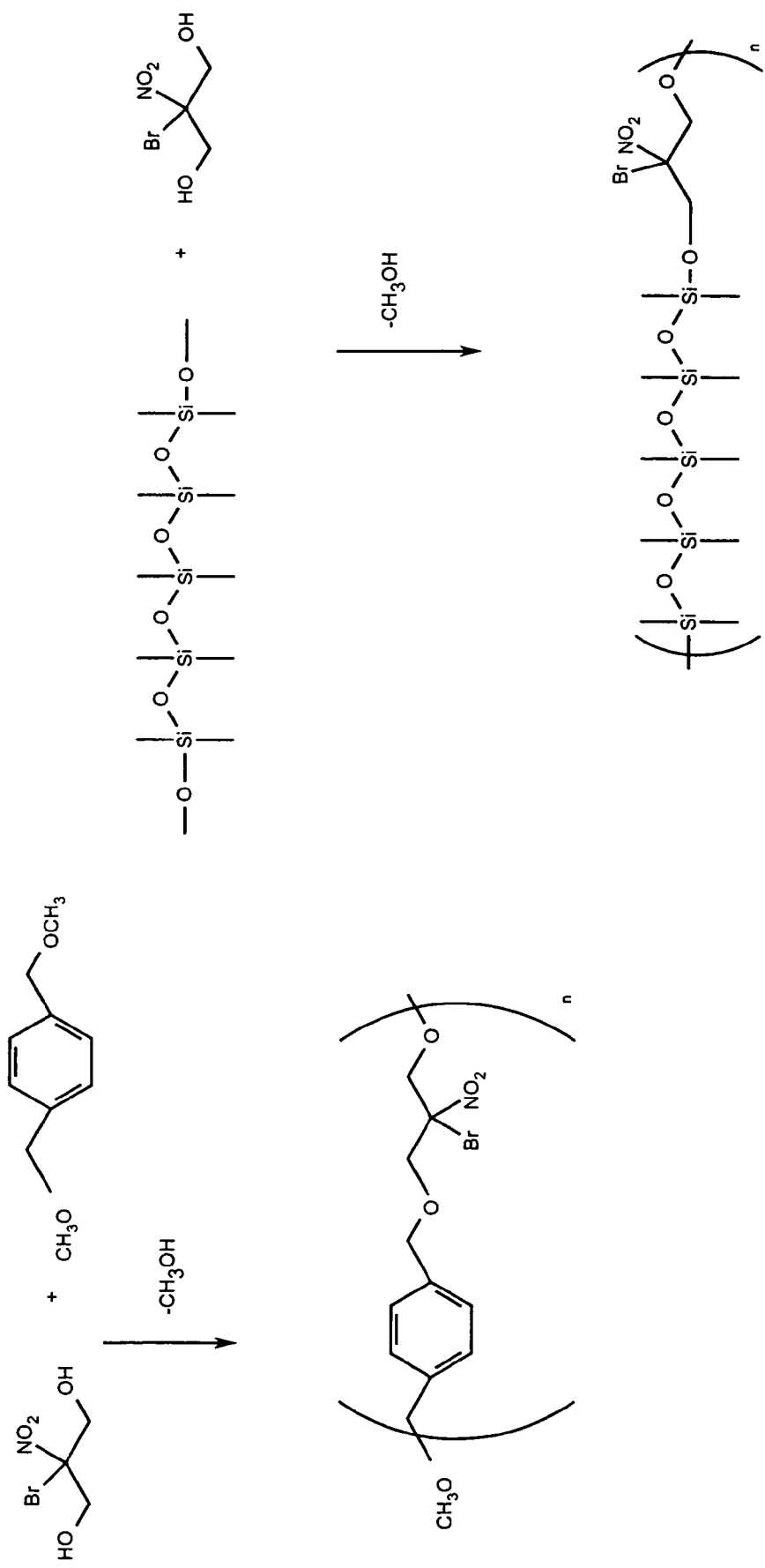
FIG. 7 shows a modified polyether and a modified polysiloxane.

FIG. 6 shows a modified epoxy resin while FIG. 7 shows a modified polyether and a modified polysiloxane. Both of these classes of structures are within the scope of the present invention. Again, all polyethers and polysiloxanes are within the scope of the present invention.

The invention relates to a bromo-nitro moiety covalently linked into the backbone of various polymers in order to provide bacterial and fungus resistance or antibacterial/antifungal polymers of many different catagories and types. The invention has many useful industrial applications.

EXAMPLES

Example 1

Urethane 6 g BNPD were desolved in 14 g γ-Butyrolacton (BLO) with strong mixing. In these 100 g urethane quality castor-oil was added also with strong mixing. Then into this mixture, 42 g aromatic isocyanate Bayer Mondur XP-744 was added drop by drop over twenty minutes, followed an additional 20 minutes of strong mixing. This prepolymer urethane of the castor-oil/BNPD can be called T-31BR.

To 39 g of Chemoddities HP70 acryl polyole, 0.12 g Eagle Sales FB 100 Defoamer, and 0.12 g Eagle Sales FX-6 slip Aid were added 15 g T-31BR. This mixture can be called componet I. To componet I was added 11 g Bayer Mondur XP-744 flavour TIC isocyanate prepolymer and 10 g BLO. The BLO was to improve flow. A sample was taken off as film, which was an excellent clear urethane layer.

The acrylic urethane layer contained 0.85% BNPD.

Example 2

Urethane 150 g of BNPD was dissolved in 150 g BLO. To 150 g of this solution was added 270 g Bayer Mondur XP-744 and heated to 150 F and held for 30 minutes. The BNPD containing isocyanate functional cross-linker was allowed to cool to room temperature.

To 25 g of the BNPD containing isocyanate cross-linker was added 30 g Chem-oddities HP70 acrylic polyol with strong mixing. This was drawndown to yield a clear, tack free urethane film that contained 9.9% BNPD.

Example 3

Urethane 10 g of BNPD was dissolved in 15 g BLO. To this solution was added 18 g Bayer Mondur XP-744 and mixed. To this solution was added 0.1 g Troymax 16% Zinc catylst. As soon as heat was seen to be evolved, the mixture was drawndown. The resulting, tack-free urethane film contained 35.7% BNPD.

Example 4

Urethane 10 g of BNPD was added directly to 18 g Bayer Mondur XP-744 and heated to 230 F and held for 30 minutes. The resulting product was drawndown and yielded a clear tack-free urethane film that contained 35.7% BNPD.

Example 5

Acrylate Resin 400 g (2 mol) BNPD with 344 g (4 mol) methyl methylmethacrylate and 150 g Xylene (reflux solvent) was combined in a nitrogen covered reaction vessel with a water condenser/trap. The mixture was heated to 141 degrees C., at which time trapped water was released. The reaction vessel has held between 154-156 degrees C. until the rate of the water loss was nearly zero. (3 hours and 7 minutes). The theoretical loss of water was 72 g. 53 g was recovered, and approximately 19 g unreacted BNPD was left in the reaktion vessel. The unreacted BNPD was removed. This conversion product can be called MAA/BNPD-002.

Then 360 g Xylene were added to a reaction vessel with agitation. The container had a nitrogen blanket and a water condenser/trap, and was heated to 141 degrees C. To this, drop by drop, over 3 hours, 20 g MAA/BNPD-002 was combined with 598 g Isobutylmethacrylate and 20 g Tert Butylperoxybenzoate were added. After adding was complete, the container was held at 142 degrees C. for 55 minutes. Then 2 g of Tert Butylperoxybenzoate in 18 g Xylene were added, and the mixture was held at 142 degrees C. for one hour. Then 2 g more of Tert Butylperoxybenzoate in 18 g Xylene were added, and again the mixture was held at 142 degrees C. for one hour. Finally 6 g Tert Butylperoxybenzoate were added, and the mixture was held at 142 degrees C. again for one hour. Then the container was removed from the heat and left to cool.

The resulting polymer had a color of bright straw, with enough transparency to be used as a clear coat. The material was drawn out to confirm this. This resin contains 924 ppm BNPD.

Example 6

Polyester Resin

In a reaction vessel with a nitrogen blanket and water condenser/trap 400 g (2 mole) BNPD were mixed with 616 g (4 mole) 1,2-Cyclohexandicarboxlic anhydride (HHPA) and 150 g Xylene as a reaction solvent and heated with agitation.

The container was heated to 162 degrees C., at which point the reaction became exothermic. The temperature was then reduced to 150 degrees of C. and held for one hour. 1162 g of a conversion product, a strong, dark transparent liquid, was recovered. This conversion product can be called MAA/BNPD-003.

In a reaction vessel with a nitrogen blanket and water condenser/trap 416 g Neopentylglycol (NPG) and 1,7 g HHPA/BNPD-003 was heated with agitation. The container was heated until the NPG began to melt. Stirring turned on and the temperature held at 149 degrees C. for one hour and 38 minutes. Then 438 g of Adipic acid were added to the container, and after two minutes water started to be released.

The container was then held between 156 degrees C. and 172 degrees C. for 3 hours, until the release of the water stopped and the temperature began to rise. A total quantity 108 g water was released. The resulting resin has a brownish color and was very clear and transparent. It contained 896 ppm BNPD.

Example 7

Diester n=1

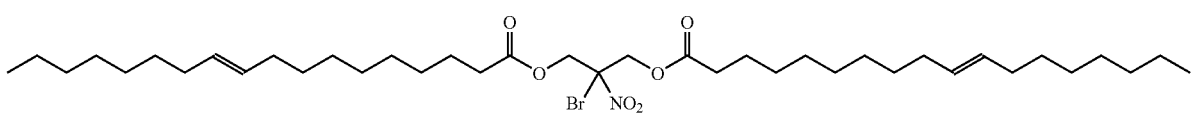

1,128 g oleic acid and 400 g BNPD plus 2 g sulfuric were charged in a three neck round bottom flask with agitation, nitrogen, and condenser and heated to 350 F and held for 2.5 hrs until 80 ml of water were recovered. This product was then incorporated into Engineered Lubricants Encool SS at 6% and 10% of the concentrate.

These samples were then submitted for ASTM D-3946-92 testing. The samples at day 5 were compared and the sample with 6% incorporation had a bacterial count of $1.5 \times 10^4$ and the sample with 10% incorporation had a bacterial count of $3\times10^3$ versus $1\times10^7$ for the sample without the product incorporated.

I claim:

1. A bromo-nitro modified polyether of the formula:

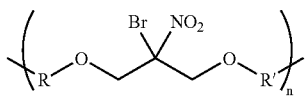

wherein R, and R' are the same or different and are independently chosen from the groups containing: [—$(CH_2O)_m$—, —$(CH_2CH_2O)_n$—, —$(CH_2CH(CH_3)O)_o$—, —$(CH_2CH(CH_2CH_3)O)_p$—] wherein m, n, o and p are independently chosen integers between 0 and around 100 wherein m, n, o and p may not all be zero.

* * * * *